US011075975B2

(12) United States Patent
Gupta

(10) Patent No.: US 11,075,975 B2
(45) Date of Patent: Jul. 27, 2021

(54) PERSONALIZATION FRAMEWORK

(71) Applicant: Microsoft Technology Licensing, LLC, Redmond, WA (US)

(72) Inventor: Rahul Gupta, Saharanpur (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 600 days.

(21) Appl. No.: 15/786,310

(22) Filed: Oct. 17, 2017

(65) Prior Publication Data
US 2019/0116218 A1    Apr. 18, 2019

(51) Int. Cl.
| | |
|---|---|
| *H04L 29/08* | (2006.01) |
| *G06N 5/04* | (2006.01) |
| *G06Q 10/10* | (2012.01) |
| *G06Q 30/06* | (2012.01) |
| *G06F 16/00* | (2019.01) |
| *H04W 4/38* | (2018.01) |
| *G05B 17/02* | (2006.01) |

(52) U.S. Cl.
CPC .............. *H04L 67/02* (2013.01); *G05B 17/02* (2013.01); *G06F 16/00* (2019.01); *G06N 5/04* (2013.01); *G06Q 10/10* (2013.01); *G06Q 10/107* (2013.01); *G06Q 10/109* (2013.01); *G06Q 30/06* (2013.01); *H04W 4/38* (2018.02); *G06F 2216/03* (2013.01)

(58) Field of Classification Search
CPC ...... H04L 67/02; G06Q 10/107; G06Q 30/06; G06Q 10/109; G06Q 10/10; G06N 5/04; G06F 16/00; G06F 2216/03; H04W 4/38; G05B 17/02
See application file for complete search history.

(56) References Cited

U.S. PATENT DOCUMENTS

| | | | | |
|---|---|---|---|---|
| 8,725,849 | B1 * | 5/2014 | Lloyd ................. | G06F 16/9574 709/220 |
| 10,446,144 | B2 * | 10/2019 | Aggarwal ............... | G06F 40/56 |

(Continued)

OTHER PUBLICATIONS

"International Search Report and Written Opinion Issued in PCT Application No. PCT/US2018/055117", dated Jan. 23, 2019, 14 Pages.

(Continued)

*Primary Examiner* — Uzma Alam
(74) *Attorney, Agent, or Firm* — Medley, Behrens & Lewis, LLC

(57) ABSTRACT

A personalization framework is provided. In example embodiments, a machine, including processing circuitry and memory, determines, based on interaction of a user with a virtual personal assistant at one or more client devices associated with an account of the user, a plurality of inferences about the user. The machine stores the plurality of inferences in an inference store associated with the virtual personal assistant. The machine stores user consent data representing whether the user provided consent for a module to access at least a portion of the inferences in the inference store. The machine receives, from the module, a request for a specified inference from the inference store. The machine verifies the user consent data associated with the specified inference and the module. The machine provides the specified inference to the module in response to verifying the user consent data.

20 Claims, 7 Drawing Sheets

(56) References Cited

U.S. PATENT DOCUMENTS

| | | | | |
|---|---|---|---|---|
| 2014/0214615 A1* | 7/2014 | Greystoke | .......... | G06Q 30/0619 |
| | | | | 705/26.44 |
| 2015/0186156 A1* | 7/2015 | Brown | .................. | G06Q 10/10 |
| | | | | 715/706 |
| 2015/0348551 A1* | 12/2015 | Gruber | ................. | G06F 40/205 |
| | | | | 704/235 |
| 2015/0358414 A1 | 12/2015 | Mehta et al. | | |
| 2015/0382047 A1* | 12/2015 | Van Os | ................ | H04N 21/858 |
| | | | | 725/38 |
| 2016/0342317 A1* | 11/2016 | Lim | ........................ | G10L 15/22 |
| 2018/0048750 A1* | 2/2018 | Hardi | ....................... | B62D 1/04 |
| 2018/0063326 A1* | 3/2018 | Tichauer | ............. | H04M 3/4936 |
| 2018/0288616 A1* | 10/2018 | Knox | .................. | G06N 3/0445 |
| 2018/0332169 A1* | 11/2018 | Somech | ................. | G06F 3/048 |

OTHER PUBLICATIONS

Walter, Derek, "How to Manage App Permissions in Android 6", Retrieved From https://www.tomsguide.com/us/android-marshmallow-app-permissions,review-3287.html, Dec. 16, 2015, 9 Pages.

* cited by examiner

PERSONALIZATION FRAMEWORK

BACKGROUND

Online service providers, such as web applications, mobile phone applications, or smart speaker device applications, obtain information about a user. Sharing that information between the applications may be desirable.

BRIEF DESCRIPTION OF THE DRAWINGS

Some embodiments of the technology are illustrated, by way of example and not limitation, in the figures of the accompanying drawings.

SUMMARY

Figure 1:
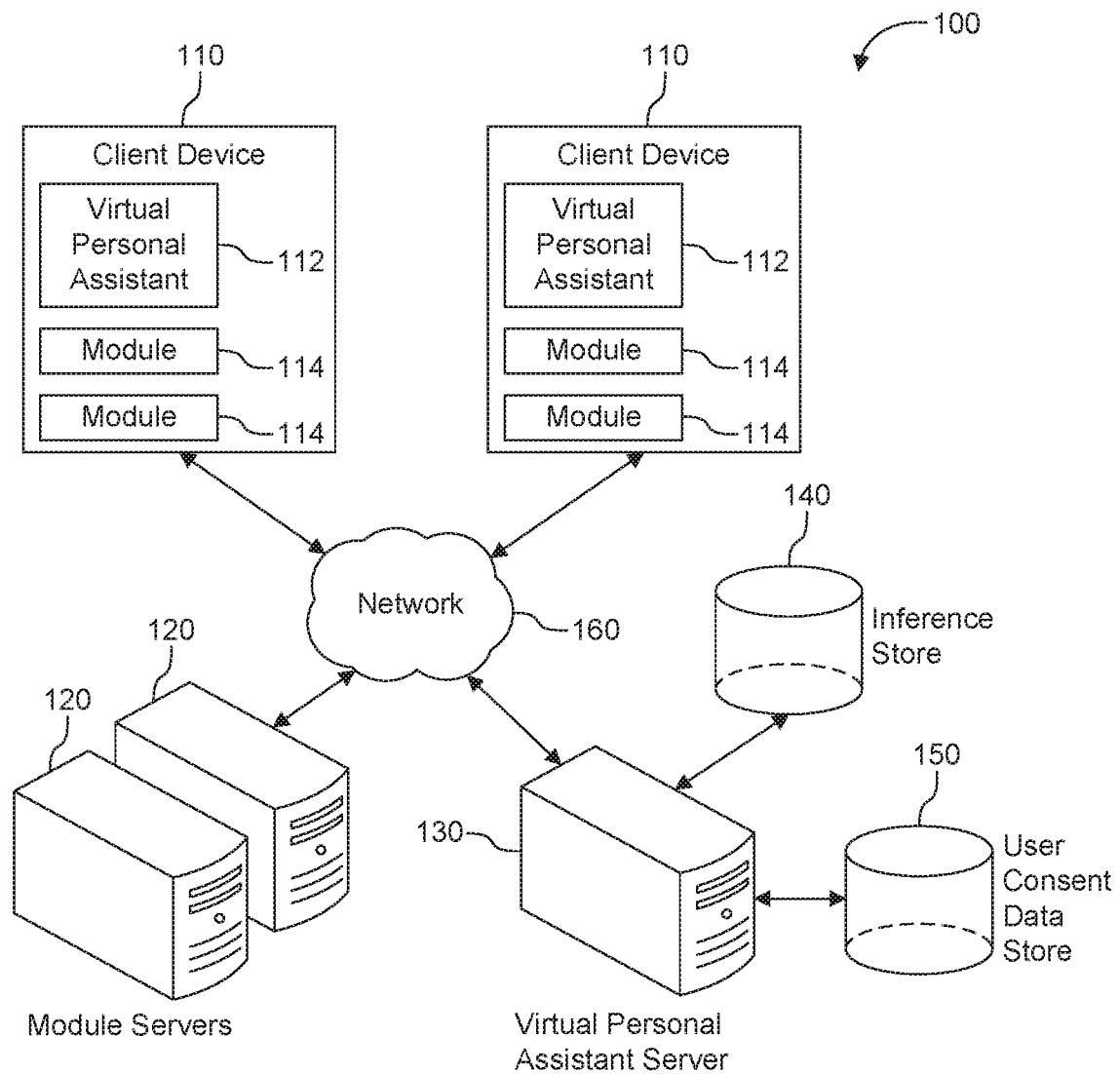
FIG. 1 illustrates an example system in which a personalization framework may be implemented, in accordance with some embodiments.

The present disclosure generally relates to machines configured to provide personalization in applications, including computerized variants of such special-purpose machines and improvements to such variants, and to the technologies by which such special-purpose machines become improved compared to other special-purpose machines that provide technology for application personalization. In particular, the present disclosure addresses systems and methods for providing a personalization framework.

According to some aspects, a system includes processing circuitry; and memory storing instructions which, when executed by the processing circuitry, cause the processing circuitry to perform operations comprising: determining, based on interaction of a user with a virtual personal assistant at one or more client devices associated with an account of the user, a plurality of inferences about the user; storing the plurality of inferences in an inference store associated with the virtual personal assistant; storing user consent data representing whether the user provided consent for a module to access at least a portion of the inferences in the inference store; receiving, from the module, a request for a specified inference from the inference store; verifying the user consent data associated with the specified inference and the module; and providing the specified inference to the module in response to verifying the user consent data.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the subject technology involve collecting personal information about users. It should be noted that the personal information about a user is collected after receiving affirmative consent from the users for the collection and storage of such information. Persistent reminders (e.g., email messages or information displays within an application) are provided to the user to notify the user that his/her information is being collected and stored. The persistent reminders may be provided whenever the user accesses an application or once every threshold time period (e.g., an email message every week). For instance, an arrow symbol may be displayed to the user on his/her mobile device to notify the user that his/her global positioning system (GPS) location is being tracked. Personal information is stored in a secure manner to ensure that no unauthorized access to the information takes place.

As noted above, sharing information about a user among multiple modules used by the user may be desirable. Some aspects of the technology described herein relate to a framework for sharing such information.

As used herein, the term "module" may include, among other things, an application at a mobile phone, tablet computer, laptop computer, or desktop computer, a skill of a smart speaker device (e.g., Microsoft Cortana®, Amazon Alexa® or Google Home®), or a web application in a web browser. A skill may include a smart speaker application. A module residing at a client device may be a native module, developed by the developer/manufacturer of the client device. Alternatively, a module residing at a client device may be a third party module developed by a developer different from the developer/manufacturer of the client device. A smart speaker device may include a voice-activated speaker device, such as a Google Home® manufactured by Google Corporation of Mountain View, Calif., an Amazon Echo® manufactured by Amazon Corporation of Seattle, Wash. or a Harman Kardon Invoke® manufactured by Harman International Industries, Inc., of Stamford, Conn. Alternatively, a smart speaker device may include any client device that includes a smart speaker application (such as an Apple iPhone®, manufactured by Apple Corporation of Cupertino, Calif., which includes Siri® or a laptop computer running a Windows® operating system, developed by Microsoft Corporation of Redmond, Wash., which includes Cortana®). The smart speaker application may be activated, by the user, using any known technique, such as pressing a button (e.g., the home button of the Apple iPhone®), selecting an icon using a mouse, joystick or keyboard, or uttering a predetermined phrase (e.g., "Hey Siri").

A client device, such as a laptop computer, desktop computer, mobile phone, tablet computer, or smart speaker device, may include a native (or third party) virtual personal assistant (e.g., implemented as an application or a skill). The virtual personal assistant may interact with the user in many different contexts and, thus, may be able to infer much information about the user, such as, a web browsing history, a web search history, cloud data, the user's current location, a device usage history, an application usage history, and the like. Further, a virtual personal assistant may know the repeated patterns of the user with respect to time and location. A virtual personal assistant may use a plurality of signals to learn about the user's preferences and to find the user's interests through machine learning, statistical analysis, and data mining.

In some cases, two different technologies are used in helping the user consume content and complete tasks. On one hand, the modules of the service providers (web based/ application based/skills based) are best in providing the respective service (e.g., checking movie show times, making restaurant reservations, ordering a taxi, and the like). On the other hand, the virtual personal assistant is best in understanding the user's preferences, likes/dislikes, and habits (as the virtual personal assistant gets information from multiple sources). The technology described herein, in some aspects, brings the power and capabilities of both the service providers and the virtual personal assistant together and enables the service providers to serve the user's needs better using the user knowledge developed by the virtual personal assistant. Some aspects include consolidating user's learned inferences and preferences from all the various sources, and sharing the user's preferences with service providers (web/ applications/skills) that provide the modules on the user's client device(s) contextually to help them serve the user's needs better. Now, these service providers can use these user inferences information and the current user context information to create new views/services/data that are personalized for the user. As used herein, "personalization" may include adjusting a module (e.g., an application or a skill) based on information that is known about the user, in response to the user's consent for such use of information. For example, if a user consents to a radio module knowing that he/she likes rock music, the radio module may be adjusted to play or suggest rock music stations to the user.

In summary, some aspects enable the virtual personal assistant to act as an agent of personalization for skills and applications. This leverages the true power of the virtual personal assistant through service providers/applications/ skills. Basically, through some implementations, all the applications and skills are able to deliver personalized experiences for the user based on information obtained and stored by the virtual personal assistant.

In one example, the virtual personal assistant knows the favorite music artists and favorite music genres of a user and, through some implementations of the technology described herein, the virtual personal assistant enables the music-related applications, such as a music video application or an audio player application, to personalize the music content for the user.

In one example, the virtual personal assistant knows the favorite dining cuisine of the user and through some implementations of the technology described herein, the virtual personal assistant enables dining-related modules, such as a restaurant reservation application, to personalize the restaurant recommendations for the user.

Some aspects provide a common platform for managing and sharing information about the user with applications. Some aspects enable content personalization for applications based on information learned about the user by the virtual personal assistant and by other modules.

Some aspects of the technology described here enable a virtual personal assistant to act as an agent of personalization for modules. This allows information obtained by the virtual personal assistant to be accessible to modules, which may be better designed for task completion. In some aspects, the modules are able to deliver personalized experiences for the user based on information obtained by the virtual personal assistant in its interaction with the user.

The platform for providing user information to modules may be useful in voice-assisted speakers, which lack a screen for providing a more complex interface to a user. Personalization may help a voice-assisted speaker provide the most value to the user in the least amount of time or using the smallest number of spoken words. For example, a user looking at a listing of movies in a cinema on a screen can easily scroll through the list to find the movie(s) and show time(s) in which the user is interested. However, when using a smart speaker without an attached or connected screen, traversing through the list of movies is more difficult and time consuming. Thus, having the smart speaker device know the user's preferences and be able to predict the movie(s) in which he/she is interested may be particularly valuable.

A virtual personal assistant may learn information about the user (e.g., the user's tastes, interests, etc.) based on the user's behavior with multiple different services (in some cases, on multiple devices). For example, the virtual personal assistant may be able to follow the user's interactions with the virtual personal assistant itself, with native modules, and with some third party modules. In some aspects, the virtual personal assistant may be used as a broker for sharing information among the modules.

The virtual personal assistant may allow the module(s) to subscribe to categories of information about the user in which they are interested, to receive information based on the subscription, and to process the information within the module(s). The user provides each application with permissions to access certain information, and the applications cannot access information which they do not have permission to access. The user's permission is stored in a data repository, and the user may access a user interface to modify his/her permission at any time.

Example Implementations

FIG. 1 illustrates an example system 100 in which a personalization framework may be implemented, in accordance with some embodiments. As shown, the system 100 includes client devices 110, module servers 120, a virtual personal assistant server 130, an inference store 140, a user consent data store 150, and a network 160. The network 160 allows the client devices 110, module servers 120, virtual personal assistant server 130, inference store 140, and user consent data store 150 to communicate with one another. The network 160 may include one or more of the internet, an intranet, a local area network (LAN), a wide area network (WAN), a wired network, a wireless network, a virtual private network (VPN), and the like.

Each client device 110 may be a laptop computer, a desktop computer, a mobile phone, a tablet computer, a smart speaker device, a smart television, a smart watch, a personal digital assistant (PDA), and the like. Each client device 110 may be associated with a user account, with each user account corresponding to at least one client device 110. Each client device 110 includes a virtual personal assistant 112 (e.g., Apple Siri®, Microsoft Cortana®, or Ok Google®) and module(s) 114. The module(s) 114 may include browser applications (e.g., web applications within a web browser), mobile phone or tablet computer applications, or smart speaker device skills. The module(s) 114 may include native modules which are provided on the client device 110 by the developer/manufacturer of the client device 110, and third party modules which are installed by the user after the user's acquisition of the client device 110. An example native module is a weather application provided by the developer/manufacturer of the client device 110. An example third party module is a restaurant reservation application/skill or a movie ticket application/skill. Each module 114 may include a skill of a smart speaker device, an application of a mobile phone or tablet computer, or a page accessible via a browser. In some cases, the virtual personal assistant 112 is native to the client device 110, and the module 114 is not native to the client device 110.

Each module server 120 implements the module 114. For example, a weather forecasting module may be coupled with a weather server that stores current weather conditions and weather forecasts. A restaurant reservation module may be coupled with a restaurant reservation server that communicates with individual restaurants to notify them of reservations being made. A movie ticket module may be coupled with a movie ticket server that stores cinema locations and movie show times and includes an interface for purchasing tickets. In some cases, each module 114 is associated with a back end at a module server 120. However, some modules 114 may lack an associated module server 120 and may be implemented completely at the client device 110. In other words, the client device 110 may implement the functions of one or more of the module servers 120.

The virtual personal assistant server 130 implements the virtual personal assistant 112. For example, the virtual personal assistant server may be coupled with a web searching interface to answer the user's questions, as well as an interface for managing the user's email, text messages, calendar, and the like. The virtual personal assistant server 120 may generate inferences about the user based on its interaction with the user. The virtual personal assistant server 120 may store those inferences in the inference store 140. The virtual personal assistant may receive user consent for sharing the inferences with the module(s) 114 and the associated module server(s) 120, as described below. Indicia of the user's consent (or lack of consent) may be stored in the user consent data store 150. As shown, the virtual personal assistant 112 has a back end at the virtual personal assistant server 130. However, in some cases, the virtual personal assistant 112 is implemented completely at the client device 110. In other words, the client device 110 may implement the functions of the virtual personal assistant server 130.

According to some implementations, the virtual personal assistant server 130 determines, based on interaction of the user with the virtual personal assistant 112 at one or more client devices 110 associated with an account of the user, multiple inferences about the user. The virtual personal assistant server 130 stores the multiple inferences in the inference store 140. The virtual personal assistant server 130 stores, in the user consent data store 150, user consent data representing whether the user provided consent for the module(s) 114 to access at least a portion of the inferences in the inference store 140. The virtual personal assistant server 130 receives, from the module 114, a request for a specified inference from the inference store 140. The virtual personal assistant server 130 verifies the user consent data associated with the specified inference and the module 114. The virtual personal assistant server 130 provides the specified inference to the module 114 in response to verifying the user consent data.

As shown, the inference store 140 and the user consent data store 150 reside on separate machines from the client device(s) 110 and the virtual personal assistant server 130. However, in some examples, the inference store 140 and/or the user consent data store 150 may reside at one of the client device(s) 110. In some examples, the inference store 140 and/or the user consent data store 150 may reside at the virtual personal assistant server 130. In some examples, one of the client device(s) 110 may implement the functions and store the data of one or more of the module server(s) 120 or the virtual personal assistant server 130.

Figure 2:
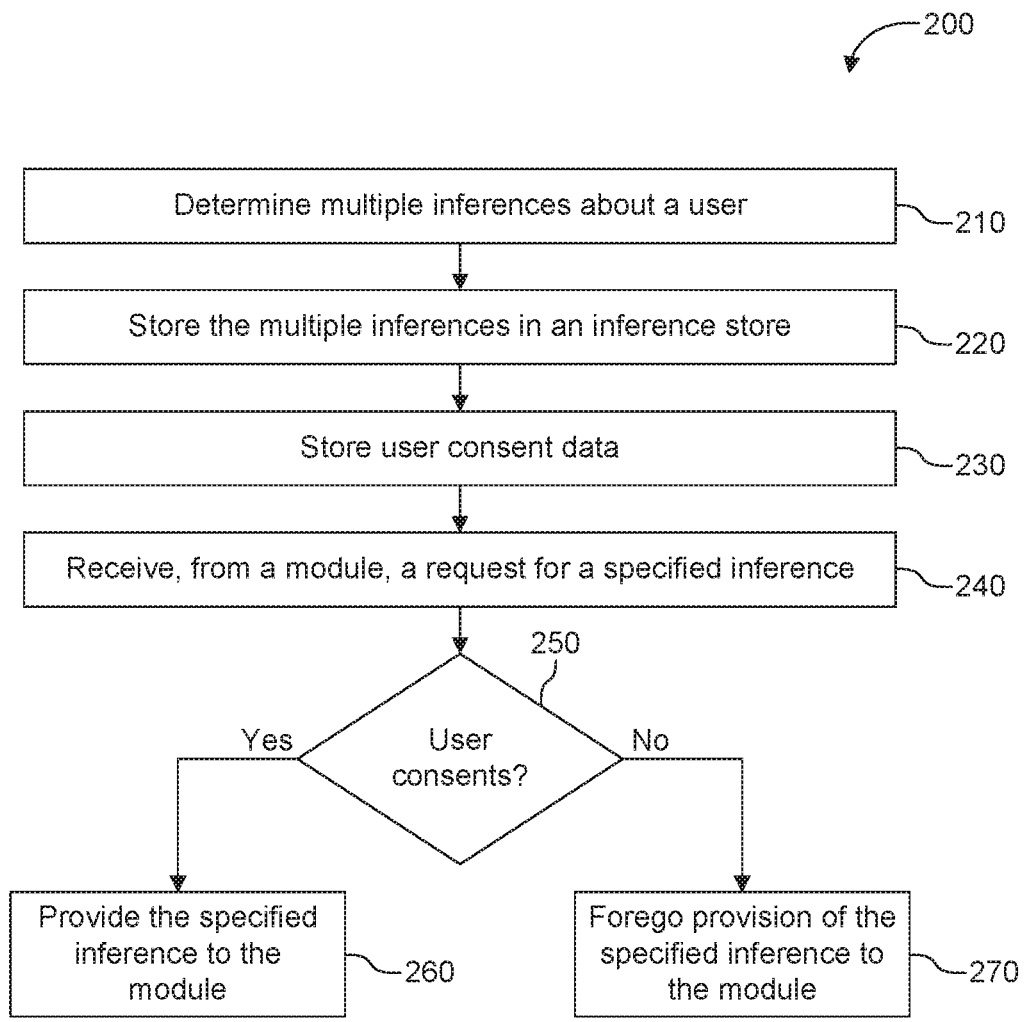
FIG. 2 is a flow chart illustrating an example method for providing an inference to a module, in accordance with some embodiments.

FIG. 2 is a flow chart illustrating an example method 200 for providing an inference to a module, in accordance with some embodiments. The method 200 may be implemented at machine, for example, at least one of the client device 110 and the virtual personal assistant server 130. While the method 200 is described as being implemented within the system 100 and in conjunction with the machines of the system 100, the method 200 may be implemented in other systems or using other machines.

At operation 210, the machine determines, based on interaction of a user with a virtual personal assistant 112 at one or more client devices 110 associated with an account of the user, multiple inferences about the user. The virtual personal assistant 112 may be native to the client device(s) 110.

At operation 220, the machine store the multiple inferences in an inference store 140 associated with the virtual personal assistant 112 (e.g., coupled with the virtual personal assistant server 130, which serves as a back end for the virtual personal assistant 112). The multiple inferences may include data about one or more of: user interests, user tastes, user habits, and repeated user activities. For example, if the user frequently accesses articles about patent law in a browser, the virtual personal assistant 112 (or the virtual personal assistant server 130) may make an inference that the user is interested in patent law. If the user watches a television series on his/her tablet computer every week, the virtual personal assistant 112 (or the virtual personal assistant server 130) may make an inference that the user has a taste for the television series. If the user frequently visits restaurants of XYZ cuisine, the virtual personal assistant 112 (or the virtual personal assistant server 130) may make an inference that the user likes XYZ cuisine. If the user takes his mobile phone to a first geographic location during the day on weekdays and to a second geographic location at night, the virtual personal assistant 112 (or the virtual personal assistant server 130) may make an inference that the user works at the first geographic location and resides at the second geographic location.

At operation 230, the machine stores (e.g., in the user consent data store 150) user consent data representing whether the user provided consent for a module 114 to access at least a portion of the stored inferences in the inference store 140. Techniques for obtaining the user consent are described herein, for example, in conjunction with FIG. 3 or FIG. 5. Alternatively, any other known technique for obtaining user consent may be used. In some cases, in a smart speaker device, the user consent data for sharing user information with a skill is obtained at the time of skill enablement. In some cases, the smart speaker device may use audio to prompt the user for consent to share an identified inference with an identified skill. The user may grant or refuse the consent, and the user has the option to modify the inference or to remove it from the memory of the smart speaker device and any other memory (e.g., a network-based memory to which the smart speaker device has access).

At operation 240, the machine receives, from the module 114, a request for a specified inference from the inference store 140.

At operation 250, the machine determines (e.g., by consulting the user consent data store 150) whether the user consents to providing the specified inference to the module. If so, the method 200 continues to operation 260. If not, the method 200 continues to operation 270.

At operation 260, in response to verifying the user consent data associated with the specified inference and the module, the machine provides the specified inference to the module. In some cases, the specified inference is provided to the module by exposing an application programming interface (API) to the module. After operation 260, the method 200 ends.

At operation 270, in response to failing to verify the user consent data associated with the specified inference and the module, the machine foregoes provision of the specified inference to the module. After operation 270, the method 200 ends.

Figure 3:
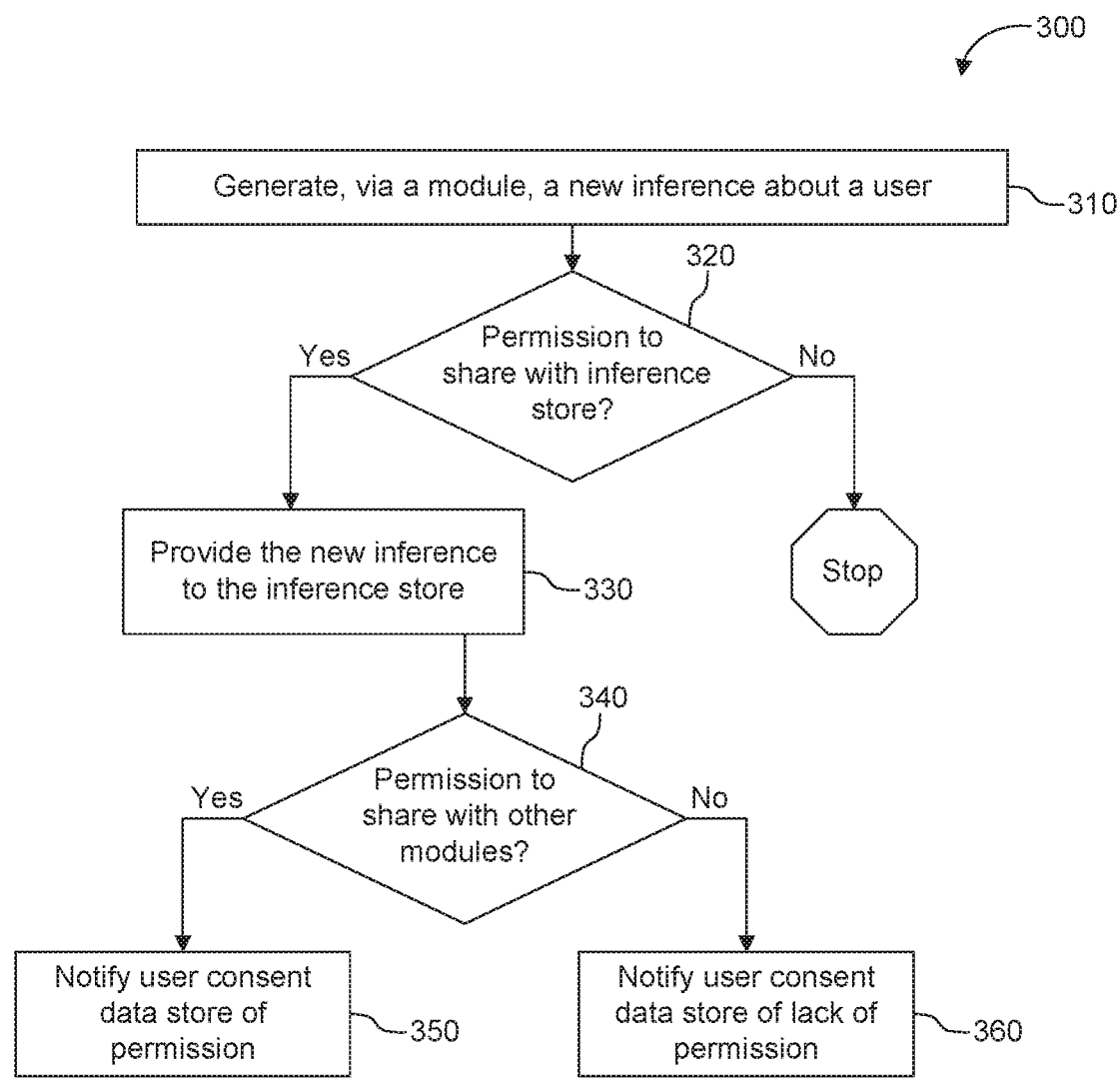
FIG. 3 is a flow chart illustrating an example method for providing an inference from a module to an inference store, in accordance with some embodiments.

FIG. 3 is a flow chart illustrating an example method 300 for providing an inference from a module to an inference store, in accordance with some embodiments. The method 300 may be implemented at machine, for example, at least one of the client device 110 and the module server(s) 120. While the method 300 is described as being implemented within the system 100 and in conjunction with the machines of the system 100, the method 300 may be implemented in other systems or using other machines.

At operation 310, the machine generates, via a module 114, a new inference about a user.

At operation 320, the machine determines whether it has permission to share the new inference with the inference store 150. For example, the machine may prompt the user for permission via the module 114. If permission is granted, the method 300 continues to operation 330. If permission is not granted, the method 300 ends.

At operation 330, if permission is granted, the machine provides the new inference to the inference store. An API for providing the new inference to the inference store may be used.

At operation 340, the machine determines whether it has permission to share the inference with other modules. For example, the machine may prompt the user for permission via the module 114. If permission is granted, the method 300 continues to operation 350. If permission is not granted, the method 300 continues to operation 360.

At operation 350, upon determining that the user permits the inference to be shared with other modules, the machine notifies the user consent data store 150 of the permission. The machine stores, in the user consent data store 150, the permission to share the inference with other modules via the inference store 140. In some cases, an API for sharing the inference may be exposed to the other modules. After operation 350, the method 300 ends.

At operation 360, upon determining that the user does not permit the inference to be shared with other modules, the machine notifies the user consent data store 150 of the lack of permission. Alternatively, no notification may be provided and the user consent data store 150 may store only affirmative indicia of consent. If no indicia are stored in the user consent data store 150, it may be assumed that there is no consent. After operation 360, the method 300 ends.

Figure 4:
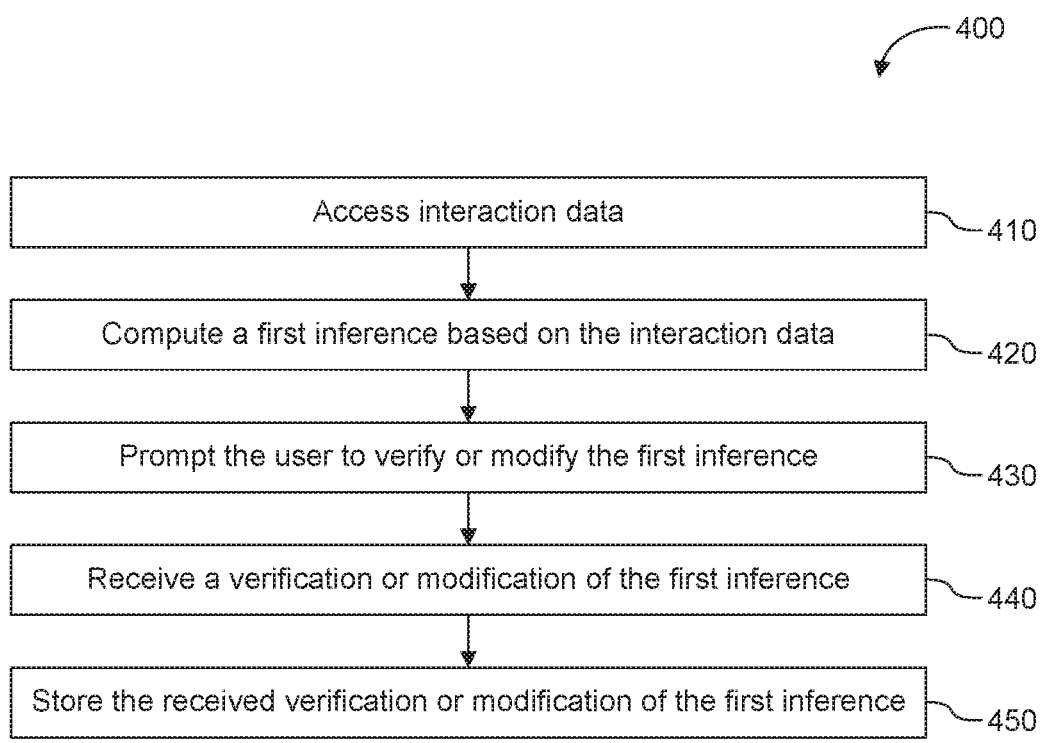
FIG. 4 is a flow chart illustrating an example method for computing and verifying an inference based on interaction data, in accordance with some embodiments.

FIG. 4 is a flow chart illustrating an example method 400 for computing and verifying an inference based on interaction data, in accordance with some embodiments. The method 400 may be implemented at machine, for example, at least one of the client device 110 and the virtual personal assistant server 130. While the method 400 is described as being implemented within the system 100 and in conjunction with the machines of the system 100, the method 400 may be implemented in other systems or using other machines.

At operation 410, the machine accesses interaction data of the user with the virtual personal assistant 112.

At operation 420, the machine computes a first inference for the multiple inferences based on the interaction data. For example, the machine may determine that the user brings his/her mobile phone into 123 Main Street at 9 AM every weekday and brings his/her mobile phone out of 123 Main Street at 5 PM every weekday. Based on this, the machine may make an inference that the user works at 123 Main Street. If the user fails to bring his/her mobile phone to 123 Main Street, the machine may make an inference that the user either has a day off, is on a vacation or business trip, or has changed jobs.

At operation 430, the machine prompts the user to verify or modify the first inference. For example, the machine display, to the user, the text, "You work at 123 Main Street," and allow the user to specify that this is correct or incorrect, to edit the inference, or to cause the machine to forget (remove from memory) the inference.

At operation 440, the machine receives, from the user, a verification or modification of the first inference. For example, the user may verify that he/she works at 123 Main Street or the user may correct his/her work address to "456 Washington Street." In one example, the user causes the machine to forget (remove from memory) his/her work address, and the work address is not stored at the machine or at any other machines of the system 100 unless the user explicitly authorizes such storage. However, storage of the work address may be beneficial to the user, for example, if the user wants to get driving directions to "work" (e.g., from the virtual personal assistant 112 or a module 114 that provides driving directions) without specifying the address. In an alternative implementation, the verification of the first inference may be completed using machine learning, using hypothesis validation techniques.

At operation 450, the machine stores, in the inference store 140, the received verification or modification of the first inference. For example, the user's work address, as confirmed and approved for storage by the user, may be stored.

Figure 5:
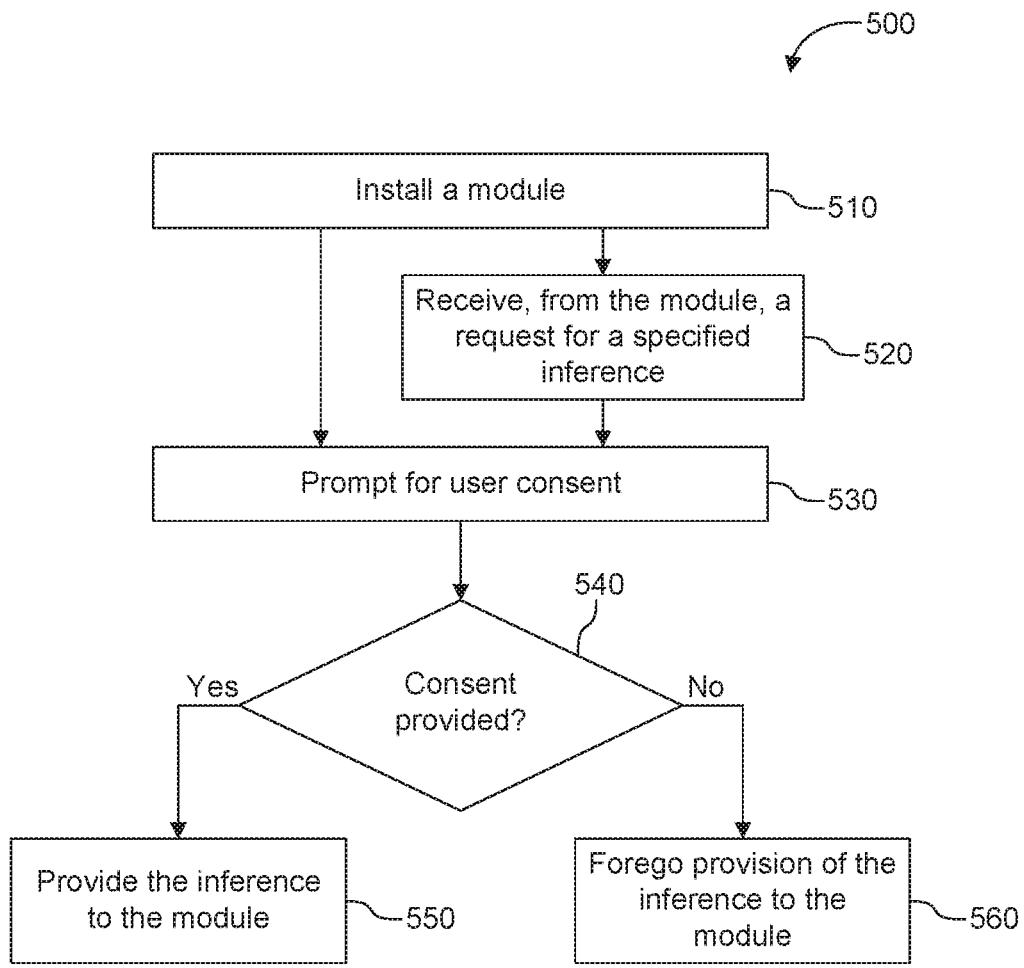
FIG. 5 is a flow chart illustrating an example method for obtaining user consent for sharing an inference with a module, in accordance with some embodiments.

FIG. 5 is a flow chart illustrating an example method 500 for obtaining user consent for sharing an inference with a module, in accordance with some embodiments. The method 500 may be implemented at machine, for example, at least one of the client device 110 and the module server(s) 120. While the method 500 is described as being implemented within the system 100 and in conjunction with the machines of the system 100, the method 500 may be implemented in other systems or using other machines.

At operation 510, the machine installs a module 114 at a first client device 110 from among one or more client devices 110 associated with a user. For example, the user may attempt to install a restaurant reservation application from an application store for a mobile phone/tablet computer or a restaurant reservation skill from a skill store for a smart speaker device. After operation 510, the method 500 may continue to either operation 520 or operation 530.

At operation 520, the machine receives, from the module 114, a request for a specified inference for the inference store 140. For example, the restaurant reservation application/ skill may request the user's favorite dining cuisine or the user's birthday.

At operation 530, the machine provides, to the user, a prompt for the user's consent to provide the specified inference to the module 114. The prompt identifies the inference. For example, the prompt may state: "ABC Restaurant Reservation Skill has requested your favorite cuisine. May we inform it that your favorite cuisine is Chinese?" The prompt may offer the user the following options in response: "Yes," "No," "Change favorite cuisine," and "Remove favorite cuisine from memory." Alternatively, the prompt may state: "ABC Restaurant Reservation Skill has requested your birthday. May we inform it that your birthday is Feb. 1, 1980?" The prompt may offer the user the following options in response: "Yes," "No," "Change birthday," and "Remove birthday from memory." The operation 530 may be implemented during or in response to the installation of operation 510. Alternatively, the operation 530 may be implemented long (e.g., days, weeks or months) after the installation is completed, in response to the request of operation 520.

At operation 540, the machine determines whether the user provided consent in response to the prompt of operation 530. If the user provided consent, the method 500 continues to operation 550. If the user did not provide consent, the method 500 continues to operation 560.

At operation 550, if the user provided consent, the machine provides the inference to the module. In some cases, the machine exposes an API for providing the inference to the module. After operation 550, the method 500 ends.

At operation 560, if the user did not provide consent, the machine forgoes provision of the inference to the module. After operation 560, the method 500 ends.

In some implementations, the inference(s) are exposed to the module(s) 114 as categories. The developer(s) of the module(s) 114 may modify the module(s) based on the available inferences. As described in this document, inferences about the user are shared from the virtual personal assistant 112 to the module(s) 114. However, it should be noted that any user data, not only inferences, may be shared with the module(s) if user consent is provided. For example, if the user notifies the virtual personal assistant 112 of his/her home address, in response to a prompt by the virtual personal assistant 112, the home address may be shared with one or more module(s) 114, if user consent is provided for such sharing.

Figure 6:
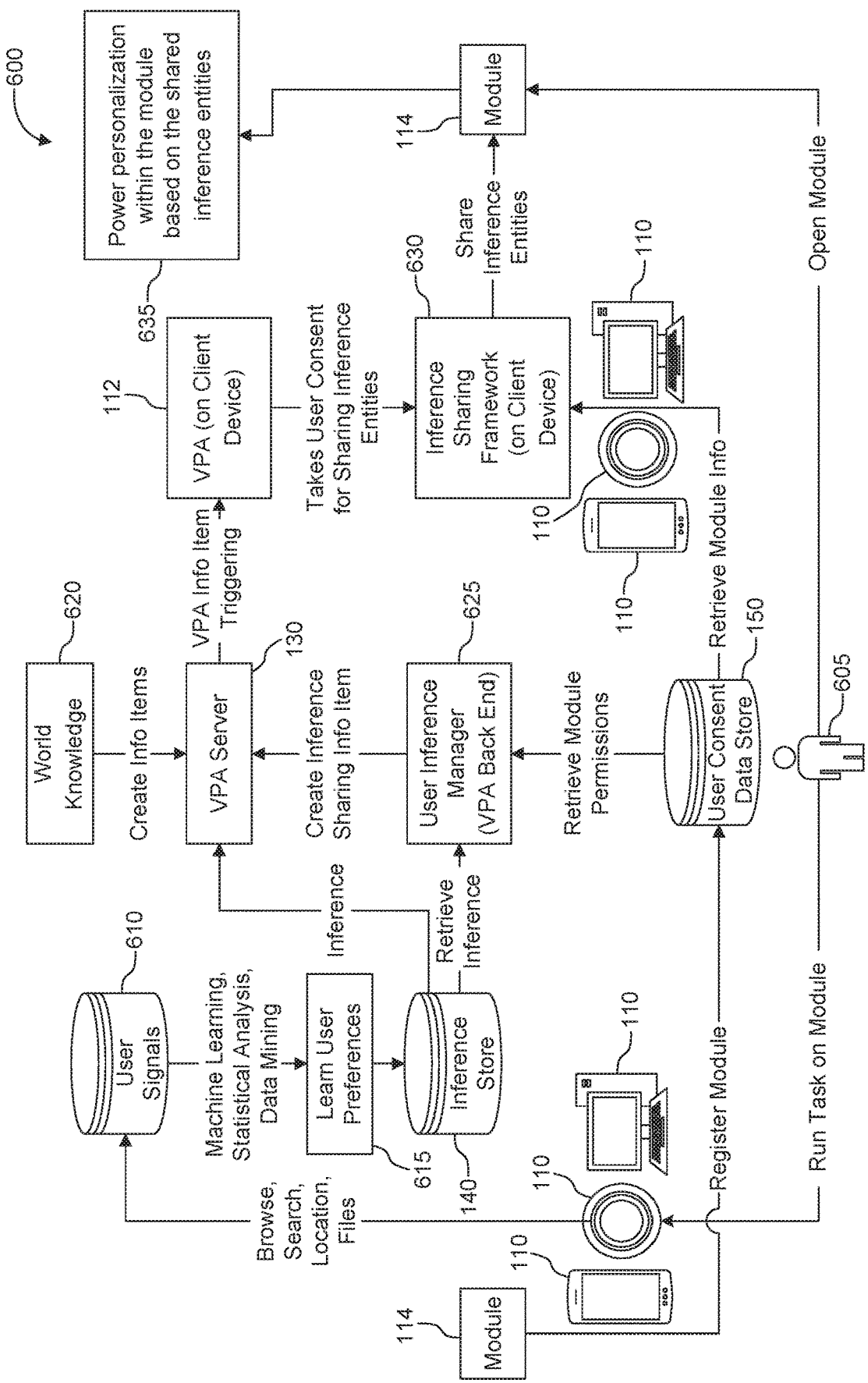
FIG. 6 is an example data flow diagram for a personalization framework, in accordance with some embodiments.

FIG. 6 is an example data flow diagram for a personalization framework 600, in accordance with some embodiments.

As illustrated in the personalization framework, a user 605 runs task(s) on a module 114 of a client device 110 (e.g., mobile phone, smart speaker device, or desktop computer). The task(s) may include browsing (e.g., a web page or web application), searching (e.g., locally or on the internet), accessing a geographic location of the client device 110, or accessing files (e.g., files residing either in a network-based storage or locally at the client device 110). The tasks are converted into user signals 610, which may be stored in a data repository. Machine learning, statistical analysis, and data mining are applied to the user signals 610 to learn user preferences 615. The learned user preferences 615 are stored in the inference store 140. The inference(s) are provided to the virtual personal assistant (VPA) server 130. The VPA server 130 accesses world knowledge 620 (e.g., an encyclopedia or other source(s) of information of interest) to create information (info) items. The inference store retrieves inference(s) from a user inference manager 625 at the VPA back end/VPA server 130. The VPA server 130 creates inference sharing information item(s) (e.g., card(s)). The VPA server 130 triggers VPA information items at the VPA 112 on the client device 110. The VPA 112 on the client device 110 tracks user consent for sharing inference entities, and provides the user consent to an inference sharing framework 630 on the client device 110.

As shown in the personalization framework 600, the module 114 on the client device 110 registers with the user consent data store 150. The user consent data store retrieves module permissions from the user inference manager 625 at the VPA back end. The user consent data store 150 retrieves module information from the inference sharing framework 630 on the client device 110. When the user 605 opens the module 114, the inference sharing framework 630 on the client device 110 shares inference entities (for which sharing was permitted by the user 605) with the module 114. As a result, personalization 635 within the module is powered based on the shared inference entities.

In some examples, the virtual personal assistant 112 creates information items (e.g., cards) for the user 605 based on information about the user 605, and these information items are triggered at certain times for the user 605 based on common usage patterns and user specific patterns. With the platform described herein, the user inferences manager 625 retrieves inferences and inferences permissions and creates proactive information items for sharing some user inference (e.g., "Favorite Cuisine") to a particular module 114, such as a restaurant reservation application or skill.

The virtual personal assistant 112 learns the user's behavior and draws inferences from all the different signals and stores these inferences in an inference store, which may include a personal data platform (PDP). Because the virtual personal assistant 112 may know the user context from parsing the user's email and may know the user's current geographic location, the virtual personal assistant 112 may draw repeat usage patterns, which may be stored in the inference store 140. These inferences stored in the inference store 140 are governed by permissions (of the user consent data store 150) to be shared with a user-selected set of modules 114.

The user 605 may interact with the modules 114. Once the user 605 grants permission, the module 114 may request a particular inference from the virtual personal assistant 112. The module 114 may store the requested inference for its usage in its own memory (e.g., in a local memory of the client device 110 or at the module server 120). If the user 605 changes his/her permission, the module 114 may be instructed to remove the inference from its own memory.

Once the module 114 receives the inference, the module 114 may create personalized experiences based on the inference. For instance, a restaurant reservation module may request, from the virtual personal assistant 112, the user's favorite cuisine and the date of the user's birthday. The restaurant reservation module may suggest restaurant recommendations based on the user's favorite cuisine. The restaurant reservation module may suggest dining options for the user's birthday.

By sharing the user's inferences with the modules 114, the virtual personal assistant 112 may enable the modules 114 to make the user experience personalized, resulting in a more user-friendly interaction. For example, when a user asks a smart speaker, "What movies are playing nearby," the movie ticket module (e.g., skill) of the smart speaker device may, based on knowledge that the user is located near Cinema X and based on knowledge that the user likes horror movies, immediately notify the user that "Horror Movie ABC is playing at Cinema X at 3 PM, 6 PM, and 9 PM," instead of going through the whole roster of movies at multiple different cinemas.

In one example, if a library application registers with the virtual personal assistant 112, then the virtual personal assistant 112 may, with the user's consent, notify the library application of the user's favorite books. The library application may then notify the user 605 of the locations of those books or present the books to the user without the user 605 explicitly searching for his/her favorite books in the library application.

Aspects include a platform that helps share user inferences from a common inference store to modules 114. Aspects include a platform that understands the current context of module 114 usage for providing user inferences to the modules 114. Aspects include a framework that automatically detects the relevant data category to which a user inference belongs. Aspects include a framework that automatically detects the relevant modules 114 that may be interested in a user inference. Aspects include a platform that allows modules 114 to subscribe to various user inferences.

Numbered Examples

Certain embodiments are described herein as numbered examples 1, 2, 3, etc. These numbered examples are provided as examples only and do not limit the subject technology.

Example 1 is a system comprising: processing circuitry; and memory storing instructions which, when executed by the processing circuitry, cause the processing circuitry to perform operations comprising: determining, based on interaction of a user with a virtual personal assistant at one or more client devices associated with an account of the user, a plurality of inferences about the user; storing the plurality of inferences in an inference store associated with the virtual personal assistant; storing user consent data representing whether the user provided consent for a module to access at least a portion of the inferences in the inference store; receiving, from the module, a request for a specified inference from the inference store; verifying the user consent data associated with the specified inference and the module; and providing the specified inference to the module in response to verifying the user consent data.

In Example 2, the subject matter of Example 1 includes, wherein the module comprise a skill of a smart speaker device, an application of a mobile phone or tablet computer, or a page accessible via a browser.

In Example 3, the subject matter of Examples 1-2 includes, wherein the virtual personal assistant is native to the one or more client devices, and wherein the module is not native to the one or more client devices.

In Example 4, the subject matter of Examples 1-3 includes, the operations further comprising: generating, via the module, a new inference about the user; prompting the user for permission to share the inference with the inference store and for permission to share the inference with other modules via the inference store; providing the new inference to the inference store upon receiving the permission to share the inference with the inference store; and storing, in the user consent data, the permission to share the inference with other modules via the inference store.

In Example 5, the subject matter of Examples 1-4 includes, wherein the plurality of inferences comprise data about one or more of: user interests, user tastes, user habits, and repeated user activities.

In Example 6, the subject matter of Examples 1-5 includes, the operations further comprising: installing the module at a first client device from among the one or more client devices; and providing a prompt, to the user, for the user consent data during installation of the module, wherein the prompt identifies the specified inference.

In Example 7, the subject matter of Examples 1-6 includes, the operations further comprising: providing a prompt, to the user, for the user consent data in response to receiving, from the module, the request for the specified inference from the inference store, wherein the prompt identifies the specified inference.

In Example 8, the subject matter of Examples 1-7 includes, wherein determining the plurality of inferences about the user comprises: accessing interaction data of the user with the virtual personal assistant; and computing a first inference for the plurality of inferences based on the interaction data.

In Example 9, the subject matter of Example 8 includes, the operations further comprising: prompting the user to verify or modify the first inference; receiving a verification or modification of the first inference; and storing the received verification or modification of the first inference.

Example 10 is a non-transitory machine-readable medium storing instructions which, when executed by processing circuitry of at least one machine, cause the processing circuitry to perform operations comprising: determining, based on interaction of a user with a virtual personal assistant at one or more client devices associated with an account of the user, a plurality of inferences about the user; storing the plurality of inferences in an inference store associated with the virtual personal assistant; storing user consent data representing whether the user provided consent for a module to access at least a portion of the inferences in the inference store; receiving, from the module, a request for a specified inference from the inference store; verifying the user consent data associated with the specified inference and the module; and providing the specified inference to the module in response to verifying the user consent data.

In Example 11, the subject matter of Example 10 includes, wherein the module comprise a skill of a smart speaker device, an application of a mobile phone or tablet computer, or a page accessible via a browser.

In Example 12, the subject matter of Examples 10-11 includes, wherein the virtual personal assistant is native to the one or more client devices, and wherein the module is not native to the one or more client devices.

In Example 13, the subject matter of Examples 10-12 includes, the operations further comprising: generating, via the module, a new inference about the user; prompting the user for permission to share the inference with the inference store and for permission to share the inference with other modules via the inference store; providing the new inference to the inference store upon receiving the permission to share the inference with the inference store; and storing, in the user consent data, the permission to share the inference with other modules via the inference store.

In Example 14, the subject matter of Examples 10-13 includes, wherein the plurality of inferences comprise data about one or more of: user interests, user tastes, user habits, and repeated user activities.

In Example 15, the subject matter of Examples 10-14 includes, the operations further comprising: installing the module at a first client device from among the one or more client devices; and providing a prompt, to the user, for the user consent data during installation of the module, wherein the prompt identifies the specified inference.

In Example 16, the subject matter of Examples 10-15 includes, the operations further comprising: providing a prompt, to the user, for the user consent data in response to receiving, from the module, the request for the specified inference from the inference store, wherein the prompt identifies the specified inference.

Example 17 is a method comprising: determining, using processing circuitry of at least one machine, based on interaction of a user with a virtual personal assistant at one or more client devices associated with an account of the user, a plurality of inferences about the user; storing the plurality of inferences in an inference store associated with the virtual personal assistant; storing user consent data representing whether the user provided consent for a module to access at least a portion of the inferences in the inference store; receiving, from the module, a request for a specified inference from the inference store; verifying the user consent data associated with the specified inference and the module; and providing the specified inference to the module in response to verifying the user consent data.

In Example 18, the subject matter of Example 17 includes, wherein the module comprise a skill of a smart speaker device, an application of a mobile phone or tablet computer, or a page accessible via a browser.

In Example 19, the subject matter of Examples 17-18 includes, wherein the virtual personal assistant is native to the one or more client devices, and wherein the module is not native to the one or more client devices.

In Example 20, the subject matter of Examples 17-19 includes, generating, via the module, a new inference about the user; prompting the user for permission to share the inference with the inference store and for permission to share the inference with other modules via the inference store; providing the new inference to the inference store upon receiving the permission to share the inference with the inference store; and storing, in the user consent data, the permission to share the inference with other modules via the inference store.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Some aspects of the subject technology involve collecting personal information about users. It should be noted that the personal information about a user is collected after receiving affirmative consent from the users for the collection and storage of such information. Persistent reminders (e.g., email messages or information displays within an application) are provided to the user to notify the user that his/her information is being collected and stored. The persistent reminders may be provided whenever the user accesses an application or once every threshold time period (e.g., an email message every week). For instance, an arrow symbol may be displayed to the user on his/her mobile device to notify the user that his/her global positioning system (GPS) location is being tracked. Personal information is stored in a secure manner to ensure that no unauthorized access to the information takes place. For example, medical and health related information may be stored in a Health Insurance Portability and Accountability Act (HIPAA) compliant manner.

Example Machine and Software Architecture

The components, methods, applications, and so forth described in conjunction with FIGS. 1-6 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 7:
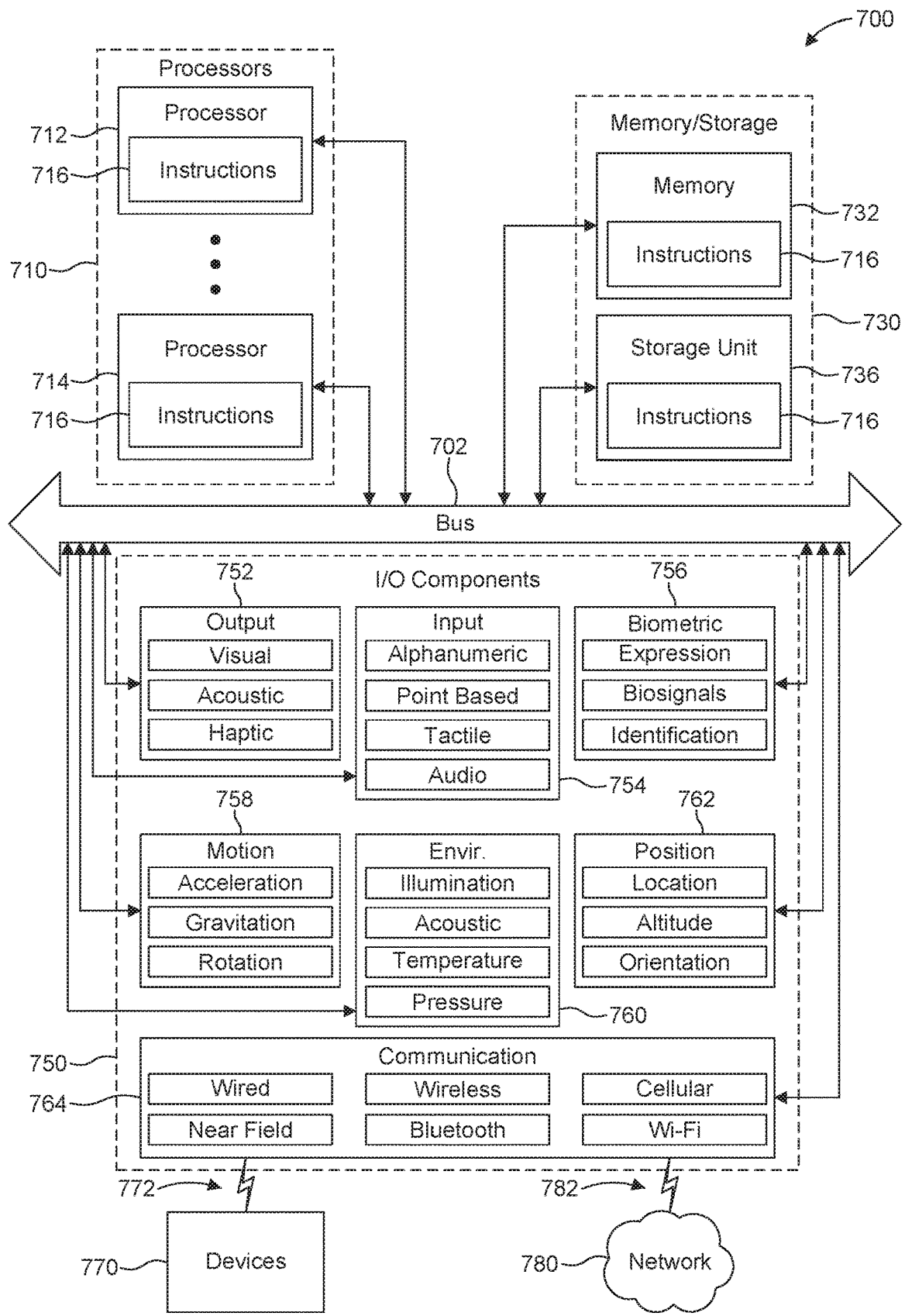
FIG. 7 is a block diagram illustrating components of a machine able to read instructions from a machine-readable medium and perform any of the methodologies discussed herein, in accordance with some embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. The instructions 716 transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components, or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 7G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

What is claimed is:

1. A system comprising:
   processing circuitry; and
   memory storing instructions which, when executed by the processing circuitry, cause the processing circuitry to perform operations comprising:
   determining, based on interaction of a user with a virtual personal assistant at one or more client devices associated with an account of the user, a plurality of inferences about the user;
   storing the plurality of inferences in an inference store associated with the virtual personal assistant;
   storing user consent data representing whether the user provided consent for a third-party module to access an inference in the inference store;
   receiving, from the module, a request for the inference from the inference store;
   verifying the user consent data associated with the inference and the module; and
   providing the inference to the module in response to verifying the user consent data.

2. The system of claim 1, wherein the module comprise a skill of a smart speaker device, an application of a mobile phone or tablet computer, or a page accessible via a browser.

3. The system of claim 1, wherein the virtual personal assistant is native to the one or more client devices, and wherein the module is not native to the one or more client devices.

4. The system of claim 1, the operations further comprising:
   receiving a new inference about the user generated by the module;
   prompting the user for permission to share the inference with the inference store and for permission to share the inference with other modules via the inference store;
   providing the new inference to the inference store upon receiving the permission to share the inference with the inference store; and
   storing, in the user consent data, the permission to share the inference with other modules via the inference store.

5. The system of claim 1, wherein the plurality of inferences comprise data about one or more of: user interests, user tastes, user habits, and repeated user activities.

6. The system of claim 1, the operations further comprising:
   installing the module at a first client device from among the one or more client devices; and
   providing a prompt, to the user, for the user consent data during installation of the module, wherein the prompt identifies the inference.

7. The system of claim 1, the operations further comprising:
   providing a prompt, to the user, for the user consent data in response to receiving, from the module, the request for the inference from the inference store, wherein the prompt identifies the inference.

8. The system of claim 1, wherein determining the plurality of inferences about the user comprises:
   accessing interaction data of the user with the virtual personal assistant; and
   computing a first inference for the plurality of inferences based on the interaction data.

9. The system of claim 8, the operations further comprising:
   prompting the user to verify or modify the first inference;
   receiving a verification or modification of the first inference; and
   storing the received verification or modification of the first inference.

10. A non-transitory machine-readable medium storing instructions which, when executed by processing circuitry of at least one machine, cause the processing circuitry to perform operations comprising:
    determining, based on interaction of a user with a virtual personal assistant at one or more client devices associated with an account of the user, a plurality of inferences about the user;
    storing the plurality of inferences in an inference store associated with the virtual personal assistant;
    storing user consent data representing whether the user provided consent for a module to access at least a portion of the inferences in the inference store, the module being separate from the virtual personal assistant;
    receiving, from the module, a request for a specified inference from the inference store;
    verifying the user consent data associated with the specified inference and the module; and
    providing the specified inference to the module in response to verifying the user consent data.

11. The machine-readable medium of claim 10, wherein the module comprise a skill of a smart speaker device, an application of a mobile phone or tablet computer, or a page accessible via a browser.

12. The machine-readable medium of claim 10, wherein the virtual personal assistant is native to the one or more client devices, and wherein the module is not native to the one or more client devices.

13. The machine-readable medium of claim 10, the operations further comprising:
    generating, via the module, a new inference about the user;

prompting the user for permission to share the inference with the inference store and for permission to share the inference with other modules via the inference store;

providing the new inference to the inference store upon receiving the permission to share the inference with the inference store; and storing, in the user consent data, the permission to share the inference with other modules via the inference store.

14. The machine-readable medium of claim 10, wherein the plurality of inferences comprise data about one or more of: user interests, user tastes, user habits, and repeated user activities.

15. The machine-readable medium of claim 10, the operations further comprising:

installing the module at a first client device from among the one or more client devices; and providing a prompt, to the user, for the user consent data during installation of the module, wherein the prompt identifies the specified inference.

16. The machine-readable medium of claim 10, the operations further comprising:

providing a prompt, to the user, for the user consent data in response to receiving, from the module, the request for the specified inference from the inference store, wherein the prompt identifies the specified inference.

17. A method comprising:

determining, by a virtual personal assistant based, a plurality of inferences about a user based on a plurality of interactions between the user and the virtual personal assistant;

storing the plurality of inferences in an inference store associated with the virtual personal assistant;

receiving a registration request from a module distinct from the virtual personal assistant;

storing, based on the registration request, user consent data representing whether the user provided consent for the module to access at least a portion of the inferences in the inference store;

receiving, from the module, a request for a specified inference from the inference store;

verifying the user consent data associated with the specified inference and the module; and providing the specified inference to the module in response to verifying the user consent data.

18. The method of claim 17, wherein the module comprise a skill of a smart speaker device, an application of a mobile phone or tablet computer, or a page accessible via a browser.

19. The method of claim 17, wherein the virtual personal assistant is native to one or more client devices, and wherein the module is not native to the one or more client devices.

20. The method of claim 17, further comprising:

receiving from the module a new inference about the user generated by the module;

prompting the user for permission to share the inference with the inference store and for permission to share the inference with other modules via the inference store;

providing the new inference to the inference store upon receiving the permission to share the inference with the inference store; and storing, in the user consent data, the permission to share the inference with other modules via the inference store.

\* \* \* \* \*